United States Patent [19]

Sanson, III et al.

[11] 4,188,300

[45] Feb. 12, 1980

[54] COSULFURIZED OLEFIN AND LARD OIL

[75] Inventors: Henry E. Sanson, III, Medford Lakes; Wallace R. Hartman, Jr., Willingboro, both of N.J.

[73] Assignee: Mayco Oil and Chemical Company, Inc., Bristol, Pa.

[21] Appl. No.: 348,458

[22] Filed: Apr. 5, 1973

[51] Int. Cl.$^2$ .................. C10M 1/38; C10M 3/32; C07G 17/00; C08H 3/00

[52] U.S. Cl. .................. 252/48.6; 260/125; 260/139; 260/399

[58] Field of Search .................. 252/48.4, 48.6, 45, 252/47.5; 260/125, 399, 139

[56] References Cited

U.S. PATENT DOCUMENTS

| | | | |
|---|---|---|---|
| 2,167,439 | 7/1939 | Kaufman | 252/48.6 |
| 2,179,065 | 11/1939 | Smith | 252/48.6 |
| 2,312,750 | 3/1943 | Cohen | 252/45 |
| 2,386,222 | 10/1945 | Lincoln et al. | 252/45 |
| 2,417,283 | 3/1947 | Zimmer et al. | 252/48.6 |
| 2,577,636 | 12/1951 | Sperry | 260/399 |
| 2,681,905 | 6/1954 | Garwood et al. | 260/139 |
| 2,694,046 | 11/1954 | Dorinson | 252/48.4 |
| 2,753,332 | 7/1956 | Bloomsburg et al. | 260/139 |
| 2,773,030 | 12/1956 | Tailleur | 252/48.6 |
| 3,455,830 | 7/1969 | Lawrence | 252/48.6 |
| 3,455,896 | 7/1969 | DenHerder et al. | 260/125 |
| 3,664,955 | 5/1972 | Panzer | 252/47.5 |
| 3,740,333 | 6/1973 | Hutchinson | 252/48.6 |
| 3,825,495 | 7/1974 | Newingham et al. | 252/48.6 |
| 3,953,347 | 4/1976 | Habiby | 252/48.6 |

Primary Examiner—Irving Vaughn
Attorney, Agent, or Firm—J. Edward Hess; Donald R. Johnson; Paul Lipsitz

[57] ABSTRACT

A lubricity additive soluble in paraffinic lubes is prepared by cosulfurizing a blend of 90 to 50 and preferably 88 to 70 parts by volume of lard oil having a free acid content of less than 0.5 wt. % and preferably less than 0.2 wt. % and a pour point of 35°–40° F. and an olefin containing 2 to 24 carbon atoms at from 365° to 445° F. for 20 minutes to 10 hours followed by blowing with a gas to remove hydrogen sulfide.

7 Claims, No Drawings

COSULFURIZED OLEFIN AND LARD OIL

BACKGROUND OF THE INVENTION

In the past, sulfurized sperm oil has been used as an additive in many lubricant formulations such as in gear oils, worm, and spur gears, automatic transmission fluids, way lubricants and as a metal working additive. Sperm oil has now become restricted and the present invention is directed to an improved replacement therefor. The present invention is directed to an improvement over the invention described and claimed in United States Patent Application Ser. No. 220,399, filed Jan. 24, 1972 by Alexander D. Recchuite, which relates to a substitute for sulfurized sperm oil. This substitute is prepared by cosulfurizing an olefin and a triglyceride. This product exhibits improved solubility in paraffinic oils over sulfurized triglycerides, while retaining the lubricity properties of such sulfurized triglycerides.

SUMMARY OF THE INVENTION

The present invention involves the discovery that by cosulfurizing an olefin with a prime burning grade lard oil having a very low free acid content a product having improved solubility in paraffinic oils is obtained as compared with the product obtained when an olefin is cosulfurized with lard oil having a higher content of free acids such as winter strained lard oil or extra winter strained lard oil.

DESCRIPTION OF THE INVENTION

The present invention involves blending from 90 to 50 and preferably from 88 to 70 parts by volume of lard oil and from 12 to 30 parts by volume of an olefin, sulfurizing the blend and then blowing the sulfurized blend with a gas to remove hydrogen sulfide. The lard oil and olefin generally are blended at from 65° F. to 340° F. and the sulfur added while the blend is within this temperature range. The lard oil used in the present invention has a maximum free fatty acid content of 0.5 wt. % and preferably 0.2 wt. % calculated as oleic acid and a pour point (ASTM) of 35° to 40° F. Such a lard oil is obtained by chilling and filter pressing the lard oil at a lower temperature than is done when preparing extra winter strained lard oil.

The olefins suitable for use in the present invention generally contain from 2 to 24 carbon atoms. For convenience in performing the process of the present invention in open vessels, the olefin should contain at least 12 and preferably 15 carbon atoms in order to prevent loss thereof from boil off as the reaction mixture is heated. Generally more than 20 carbon atoms and especially more than 24 carbon atoms olefins are not used because the amount of material needed to supply the reactive double bonds becomes excessive. The olefin may be straight chain or branched. Also suitable is any hydrocarbon containing one ethylenically unsaturated carbon-carbon double bond and one aromatic or cycloaliphatic ring. Multiple ring hydrocarbons and di- or tri- double bond containing hydrocarbons do not give as oil soluble a product as is desired. The true olefins are preferred. The double bond should not be in a ring or reduced solubility of the product in paraffinic oils will be observed. Thus the suitable unsaturated hydrocarbons have the structure

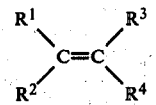

Where $R^1$, $R^2$ and $R^3$ are either hydrogen or alkyl and $R^4$ is hydrogen, alkyl, aryl, cycloalkyl or alkaryl. Generally the α-olefins give the best properties in the final product. When using a normally gaseous unsaturated hydrocarbon the volume percent present is calculated from the apparent density of such unsaturated hydrocarbon in a normally liquid hydrocarbon.

The amount of sulfur generally varies from 5 to 25 weight percent as based on the blend of lard oil and olefin. Usually an inactive sulfurized product is desired in which case no more than 15 weight percent sulfur as based on the blend should be used. The resulting product containing from 5 to 15 weight percent, sulfur is useful as a friction modifier for many applications as well as for many applications as a metal-working oil additive. The cosulfurized product containing 15–25 wt. % sulfur is useful as a metal-working oil additive. The amount of sulfur in a given sample of oil is readily determined by X-ray fluorescence. After the total sulfur is determined, 100 g. of the oil sample and 20 g. of copper powder are placed in a tall 250 ml. beaker set up on a hot plate and equipped with a thermometer and an auger stirrer operated at 1750 rpm. The sample is heated to 350° F. within a 5 minute period and maintained at 350° F.±5° F. for one hour after which it is cooled and filtered through filter paper to remove the copper powder. The sulfur content of the sample is again determined by X-ray fluorescence which is the inactive sulfur. The loss of (total minus inactive sulfur) is the amount of active sulfur in the original sample.

The amount of active sulfur in a sulfurized oil being used as a friction modifier should be less than 2.5 wt. %. Generally the friction modifiers of the present invention containing 5–15% by weight total sulfur contain from 1 to 2 wt. % active sulfur.

Generally the sulfur is added to the blend of lard oil and olefin over a period of 1 to 60 minutes while the blend is maintained at 250°–330° F. with constant stirring. The temperature is not particularly critical. The 250° F. represents the softening point of the sulfur and the 330° F. represents the flash point of the blend when the olefin is a blend of $C_{15}$–$C_{20}$ α-olefins.

After addition of sulfur the mixture is heated. Generally the heating should be carried out at from 365° to 445° F. The use of at least 365° F. minimizes the amount of active sulfur in the product. The cosulfurized products of the present invention have flash points of about 445° F. and this is the maximum temperature that will normally be used.

After the heating step the sulfurized oil is blown with a gas to remove $H_2S$ which forms during the sulfurization reaction. Any gas may be used which dissolves $H_2S$ and does not significantly react with the sulfurized oil. Suitable gases include air, nitrogen, carbon dioxide and gaseous perhalogenated hydrocarbons. Air is preferred for obvious economic considerations. The blowing is most simply carried out by bubbling the gas through the sulfurized oil. Alternatively the oil may be sprayed into the gas or a falling curtain of the oil in the gas may be used. Generally the blowing is carried out at 125° F. to 250° F.

The products of the present invention possess properties not possessed by either sulfurized lard oil or sulfurized olefins or blends of separately sulfurized lard oil and sulfurized olefins. The sulfurized lard oil suffers from lack of compatibility with paraffinic lubes. The sulfurized olefins do not have adequate lubricity as evidenced by their poor stick/slip ratios. The cosulfurized blend of the present invention exhibits improved solubility in paraffinic lubes as compared with a cosulfurized blend of extra winter strained lard oil and an olefin.

In many cases it is desired to improve the copper strip test rating of the cosulfurized product. This is readily accomplished by the incorporation of minor amounts of benzotriazole in the composition. Suitable benzotriazoles include, 1,2,3-benzotriazole itself and 1,2,3-benzotriazole substituted with various alkyl or alkyl groups. The benzotriazole forms a coating on the copper thereby protecting it from attack.

DESCRIPTION OF THE PREFERRED EMBODIMENTS

EXAMPLE I

A blend of 85 vol. % of prime burning grade lard oil having a pour point of 47° F. and 0.1% free fatty acid calculated as oleic acid and 15 vol. % of a blend of predominantly straight chain α-olefin containing 15–20 carbon atoms obtained by catalytically cracking wax are charged to a 5 L kettle equipped with a vibromixer. The mixture is heated to 250° F. and 264 g. of sulfur are added over a period of a few minutes. The temperature is raised to 375° F. for 2 hours. The mixture is then cooled to 230° F. and air is bubbled through the mixture for 2 hours by means of a glass tube at a moderate rate somewhat below that at which splashing and agitation take place. The resulting sulfurized oil is analyzed and found to contain 8.35 wt. % total sulfur and 0.59 wt. % active sulfur. This product exhibits a copper strip test rating of 4, (ASTM D-130). When 0.5 wt. % of Amoco 150 (an alkyd derivative of 2,5-dimercapto-1,3,4-thiadiazole which is a metal deactivator) is added the product exhibits a copper strip test rating of 1 ab. When 10 grams of the cosulfurized product is dissolved in 100 grams of a solvent refined brightstock having a viscosity of 169 SUS at 210° F., a V.I. of 95 and containing 23% aromatics the solution is free of haze when stored overnight at 36° F. and after standing for a week at room temperature. A similar product prepared in the same way but using extra winter strained lard oil when tested in the same way in the same oil exhibits a slight haze when chilled to 36° F. overnight or stored for a week at room temperature. The two products have substantially the same lubricity properties when dissolved in paraffinic or naphthenic oils.

The invention claimed is:

1. A composition comprising a cosulfurized blend of from 50 to 90 parts by volume of lard oil containing free fatty acid but below 0.5 weight percent calculated as oleic acid and having a pour point of 35° to 40° F., and from 50 to 10 parts by volume of a hydrocarbon containing from 2 to about 24 carbon atoms and having the structure

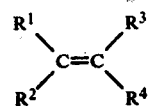

wherein $R^1$, $R^2$ and $R^3$ are either hydrogen or alkyl and $R^4$ is either hydrogen, alkyl, aryl, cycloalkyl or alkaryl, which cosulfurized blend contains chemically combined therewith from 5 to 25 weight percent as based on said blend of sulfur.

2. The composition of claim 1 wherein $R^4$ is alkyl.

3. The composition of claim 2 wherein $R^1$, $R^2$ and $R^3$ are hydrogen.

4. The composition of claim 3 wherein from 88 to 70 parts by volume of lard oil and from 12 to 30 parts by volume of the hydrocarbon is present.

5. The composition of claim 4 wherein from 5 to 15 weight percent sulfur is present.

6. The composition of claim 5 wherein the hydrocarbon contains from 15 to 20 carbon atoms.

7. The composition of claim 6 wherein the lard oil has a free acid content of below 0.2 weight percent calculated as oleic acid.

* * * * *